(12) United States Patent
Le Brech et al.

(10) Patent No.: US 12,279,559 B2
(45) Date of Patent: Apr. 22, 2025

(54) HARVESTING UNIT FOR A HARVESTING MACHINE

(71) Applicant: CNH Industrial America LLC, New Holland, PA (US)

(72) Inventors: Laurent Le Brech, Le Poiré-sur-Vie (FR); David Beleteau, Challans (FR)

(73) Assignee: CNH Industrial America LLC, New Holland, PA (US)

( * ) Notice: Subject to any disclaimer, the term of this patent is extended or adjusted under 35 U.S.C. 154(b) by 940 days.

(21) Appl. No.: 17/272,647

(22) PCT Filed: Aug. 26, 2019

(86) PCT No.: PCT/EP2019/072695
§ 371 (c)(1),
(2) Date: Mar. 1, 2021

(87) PCT Pub. No.: WO2020/043656
PCT Pub. Date: Mar. 5, 2020

(65) Prior Publication Data
US 2021/0337732 A1     Nov. 4, 2021

(30) Foreign Application Priority Data
Aug. 29, 2018 (FR) ...................... 1857780

(51) Int. Cl.
*A01D 46/26* (2006.01)
*F16H 19/08* (2006.01)
(Continued)

(52) U.S. Cl.
CPC .......... *A01D 46/264* (2013.01); *F16H 19/08* (2013.01); *A01D 46/06* (2013.01); *A01D 46/28* (2013.01)

(58) Field of Classification Search
CPC ........ A01D 46/00–46/30; A01D 69/00–69/12; A01D 46/264; F16H 19/08
See application file for complete search history.

(56) References Cited

U.S. PATENT DOCUMENTS 3,344,591 A   10/1967 Christie et al.
3,507,162 A   4/1970 Nomura et al.
(Continued)

FOREIGN PATENT DOCUMENTS

CN   201351725 Y   11/2009
CN   101482163 A   5/2013
(Continued)

OTHER PUBLICATIONS

SU-1371598-A2 (Year: 1988).*
International Search Report and Written Opinion for PCT Application No. PCT/EP2019/072695 dated Nov. 7, 2019 (12 pages).

*Primary Examiner* — Thomas B Will
*Assistant Examiner* — Madeline I Runco
(74) *Attorney, Agent, or Firm* — Peter K. Zacharias; Rickard K. DeMille; Rebecca L. Henkel

(57) ABSTRACT

A harvesting unit including a chassis intended to be moved along rows of plants to be harvested, and a shaker system including a shaker device including: a drum operable to detach a crop from the plants, the drum including a drum shaft mounted for rotation on the chassis about a vertical axis and shaker organs mounted to the drum shaft; a rotational driving mechanism for the drum including a driven body and a first driving device engaged with the driven body to steer its rotation about the vertical axis; an oscillatory driving mechanism for the drum about the vertical axis including comprising an eccentric module and a second driving device engaged with the eccentric module to steer its rotation, the eccentric module being connected to the drum (Continued)

shaft by a mechanical member arranged to transform the eccentric rotation of the eccentric module into an oscillation of the drum shaft.

17 Claims, 3 Drawing Sheets

(51) Int. Cl.
  *A01D 46/06* (2006.01)
  *A01D 46/28* (2006.01)

(56) References Cited

U.S. PATENT DOCUMENTS

| | | | |
|---|---|---|---|
| 4,114,463 A * | 9/1978 | Garden | A01D 46/28 74/61 |
| 4,173,859 A | 11/1979 | Goldsmith et al. | |
| 4,265,080 A * | 5/1981 | Goldsmith | A01D 46/28 56/330 |
| 4,282,706 A | 8/1981 | Orlando | |
| 4,283,906 A | 8/1981 | Scudder | |
| 4,359,855 A | 11/1982 | Goldsmith | |
| 4,974,405 A | 12/1990 | Littau | |
| 4,993,702 A | 2/1991 | Jackson | |
| 5,170,614 A | 12/1992 | Williamson et al. | |
| 5,316,519 A * | 5/1994 | Johnson | A01F 12/187 460/142 |
| 5,685,773 A | 11/1997 | Meester et al. | |
| 5,908,352 A | 6/1999 | Meester et al. | |
| 6,691,500 B2 | 2/2004 | Orlando | |
| 2002/0129593 A1 | 9/2002 | Orlando | |
| 2005/0034441 A1 | 2/2005 | Porta et al. | |
| 2008/0060336 A1 | 3/2008 | Bonadeo | |
| 2013/0126201 A1 | 5/2013 | Zhang et al. | |

FOREIGN PATENT DOCUMENTS

| | | |
|---|---|---|
| CN | 106233924 A | 12/2016 |
| CN | 107228164 A | 10/2017 |
| DE | 102004006139 A1 | 8/2005 |
| DE | 102012223493 A1 | 7/2013 |
| DE | 202012012604 U1 | 10/2013 |
| DE | 202014001781 U1 | 5/2014 |
| FR | 2558556 A1 | 7/1985 |
| FR | 1439314 A | 5/1996 |
| FR | 3045272 A1 | 6/2017 |
| GB | 1435013 A | 5/1976 |
| SU | 1371598 A2 * | 2/1988 |

* cited by examiner

HARVESTING UNIT FOR A HARVESTING MACHINE

The invention relates to a harvesting unit, as well as a harvesting machine comprising a motorised support structure which is movable along rows of plants and on which such a harvesting unit is mounted for detaching crop from said plants.

The invention applies in particular to the technical domain of mechanical harvesting of fruits growing on plants, such as trees or bushes, that are arranged in rows, such as grapes, berries, coffee beans, olives, almonds, oranges and other citrus fruits, and other cultivated fruits.

More particularly, the harvesting machine is intended for harvesting olives, said machine being in particular intended to a mode for planting olive trees that is said intensive.

Fruits are conventionally harvested by a harvesting machine comprising a motorised support structure that is movable along rows of plants, a harvesting unit being mounted on said structure for straddling at least one of said rows of plants and harvesting fruits from said row. To that end, the harvesting unit includes a straddling chassis that delimits a harvesting tunnel, into which the plants are successively introduced to move through said tunnel between respective openings at the front and at the rear of said tunnel.

To detach the fruit from the plants, a particular harvesting unit may include a shaker system including at least one shaker device, for example, two shaker devices that are provided on respective sides of the harvesting tunnel to delimit said tunnel transversely.

The harvesting machine may further include a system for recovering the crop detached by the harvesting unit, which enables, possibly after cleaning and/or sorting, the storage thereof in at least one hopper provided for that purpose on the harvesting machine or in an ancillary trailer.

Document FR-3 045 272 provides a harvesting unit with a shaker system including two shaker devices, each of said shaker devices comprising:
- a drum operable to detach a crop from the plants, said drum comprising a drum shaft mounted for rotation on the chassis of said harvesting unit about a vertical axis, as well as several rods that extend radially and are operable to shake the plants for detaching said crop therefrom;
- a rotational driving device of the drum, said mechanism comprising a rotating driven body and a driving device that is engaged with said driven body to steer its rotation about the vertical axis.

To facilitate the detachment of the crop, the drums can also be driven in oscillation about the vertical axis, so as to induce a vibration of the shaker rods, and then to increase interactions of said drum with the plants. Advantageously, the rotation and oscillatory movements of the drum can be superimposed to one another.

To that effect, document FR-3 045 272 provides to equip each shaker device with a planetary gear system arranged to combine the rotation and the oscillation of the drum, said planetary gear system comprising:
- a crown gear which is steered in rotation by means of a transmission belt or an endless chain driven by a motor and which is provided with internal gearing teeth;
- a sun wheel with external gearing teeth and a connecting rod with two ends that are mounted eccentrically respectively on said sun wheel and on a rotating disk driven by a motor;
- a mechanical member comprising a carrier plate associated in rotation with the shaft of the drum, said plate carrying planet gears that are engaged between the internal teeth of the crown gear and the external teeth of the sun wheel, so as to transmit the respective rotations of said crown gear and said sun wheel to the shaft of the drum by means of said carrier plate.

However, the planetary gear system and its drives are cumbersome and relatively complex, and require a lot of space on the machine. Moreover, the reaction of the plants on the shaker rods causes important mechanical stress in the planetary gear, which can wear out and then deteriorate the harvesting unit.

The invention aims to improve the prior art by proposing a harvesting unit wherein the shaker drums are steered in rotation and in oscillation by means of mechanisms that are simple to implement, in particular by being more compact, and that present a greater resistance to the mechanical constraints transmitted by the shaker rods.

For that purpose, and according to a first aspect, the invention relates to a harvesting unit comprising a chassis intended to be moved along rows of plants to be harvested, and a shaker system including at least one shaker device, said shaker device comprising:
- a drum operable to detach a crop from said plants, said drum comprising a drum shaft mounted for rotation on said chassis about a vertical axis and shaker organs mounted to said drum shaft;
- a rotational driving mechanism of said drum, said mechanism comprising a driven body and a driving device engaged with said driven body to steer its rotation about said vertical axis;
- an oscillatory driving mechanism of said drum about said vertical axis, said mechanism comprising at least one eccentric module and a driving device engaged with said module to steer its rotation, said module being connected to the drum shaft by a mechanical member arranged to transform the eccentric rotation of said module into an oscillation of said drum shaft;

the eccentric module being mounted for rotation on the driven body of the rotational driving mechanism, the mechanical member being arranged to transmit the rotation of said driven body to the drum shaft.

According to a second aspect, the invention relates to a harvesting machine comprising a motorised support structure which is movable along rows of plants, such a harvesting unit being mounted on said motorised support structure for detaching the crop from said plants.

Other aspects and advantages of the invention will become apparent in the following description made with reference to the appended figures, in which.

Figure 1:
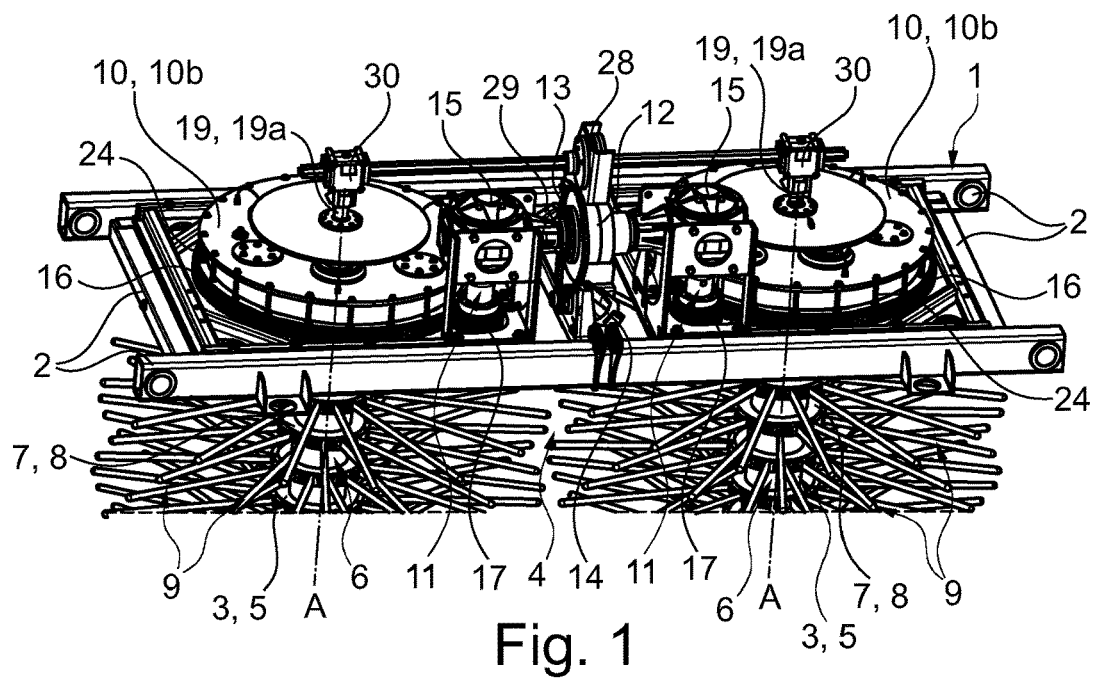
FIG. 1 represents partially in perspective the top part of a harvesting unit according to the invention.

In relation to those figures, we describe below a harvesting unit, as well as a harvesting machine on which such a harvesting unit is mounted.

The harvesting machine is in particular arranged for the mechanical harvesting of fruits growing on plants, such as trees or bushes, that are arranged in rows, such as grapes, berries, coffee beans, olives, almonds, oranges, citrus, and other fruits.

More particularly, the harvesting machine is intended for harvesting olives, said machine being in particular intended to a mode for planting olive trees that is said intensive.

To that end, the harvesting machine comprises a motorized support structure, which can be equipped in particular with a driver station, and that is movable along rows of plants to be harvested, a harvesting unit being mounted on said structure for straddling at least one of said rows of plants and detaching fruits from said plants.

In particular, the harvesting unit can be mounted on the support structure permanently or removably, so as to be replaceable by other equipment and accessories, for example spraying equipment, pruning equipment or equipment for working the soil.

The harvesting machine can comprise at least one hydraulic motor connected to wheels or tracks for enabling the movement of the support structure. In particular, the support structure can be a tractor equipped with four driving and/or steering wheels that are each coupled with a hydraulic motor that is provided with a closed loop hydrostatic transmission circuit.

In particular, the rotation speed of the hydraulic motors can be regulated by a control system with a flow rate proportional to the travel speed of the support structure, said control system possibly being electronical and enabling to correct said rotation speed according to the variations of said travel speed (speed reduction, differences between the travel speed in uphill and downhill slopes, slipping).

The harvesting machine can also include a recovery unit for recovering the crop detached by the harvesting unit, as well as a unit for cleaning and/or sorting said detached crop to eliminate components other than fruit, in particular leaves, leaf stalks and wood particles, before the storage of said crop in at least one hopper provided for that purpose on the harvesting machine or in an ancillary trailer.

The harvesting unit comprises a chassis 1 that can be mounted on the support structure in a fixed or in a pendulum manner about a horizontal and longitudinal axis. In particular, the chassis 1 may comprise several metallic profiles 2 that can be assembled by welding.

The harvesting unit comprises a shaker system which comprises at least one shaker device 3 mounted on the chassis 1. In relation to FIG. 1, the chassis 1 delimits a tunnel 4 into which plants to be harvested are introduced successively to move through said tunnel between respective openings at the front and at the rear of said tunnel, the shaker system comprising two shaker devices 3 that are arranged respectively on one side of said tunnel to delimit said tunnel transversely.

Each shaker device 3 comprises a drum 5 that is mounted for rotation on the chassis 1 and that is operable to detach the crop form the plants introduced into the harvesting tunnel 4.

The drums 5 present a general cylindrical geometry and comprise each a shaft 6 mounted for rotation on the chassis 1 about a vertical axis A, as well as several shaker organs 7 which extend transversally and are vertically spaced from each other along the rotation axis A, said shaker organs being driven for rotation by the shaft 6.

In particular, the shaker organs 7 extend along substantially the whole height of a drum 5, in order to optimize the shaking height, which enables to harvest in a satisfactory manner the fruits disposed on the whole height of the plants.

Moreover, each shaker organ 7 can be fixed to the shaft 6 in a reversible manner, in order to be replaceable by another shaker organ 7 with for example a different form and/or a different size, in accordance with the type of crop to be detached.

As shown in FIG. 1, the shaker organs 7 are vertically stacked on the rotating shaft 6 of each drum 5. Each shaker organ 7 comprises a ring 8 that is fixed around the shaft 6 and from which several shaker rods 9 extend radially.

Each shaker rod 9 is arranged to exert a shaking effort on the plants independently from the other shaker rods 9, said rod comprising an inner end that is fixed to the ring 8 and a free end that is opposed to the rotating shaft 6.

The shaker rods 9 can present a cross section that is small compared to their length, and can be made of a flexible material, for example, a polyester resin charged with fiberglass, or polyamide, said material having an optimal flexibility/rigidity trade-off for ensuring an efficient shaking of the plants while ensuring the preservation of said plants. It is also possible to provide shaker rods 9 made of a more flexible material, such as for example polyurethane.

Moreover, shaker rods 9 can be hollow or full, or they can have a structure with a core having the desired flexibility properties and surrounded by a layer made of a wear material that is different from the material of the core.

Each shaker device 3 comprises a rotational driving mechanism of its drum 5, said mechanism comprising a driven body 10 and a driving device 11 engaged with said driven body to steer its rotation about the vertical axis A.

In particular, the harvesting machine can be equipped with means for controlling the driving device such that the rotation driving speed of the drum 5 is set according to the travel speed of the support structure on the field.

This control of the rotation driving speed of the drums enables to control optimally and continuously the shaking of the plants, in particular concerning the effort exerted by the shaker rods 9 on said plants, which enables to harvest the crop efficiently while preserving the integrity of said plants.

The rotational driving mechanisms can be driven by hydraulic means that are integrated either directly into the hydrostatic transmission circuit for the movement of the support structure, or into an auxiliary transmission circuit that is independent and parallel to said movement transmission circuit, said hydraulic driving means being controlled in particular through a flow rate control that is proportional to the movement of the support structure.

According to a variant, the rotational driving mechanisms and/or the movement of the support structure can be driven by any other known driving means, for example through electrical means.

As shown in FIG. 1, the harvesting unit comprises a first central horizontal rotating shaft 12 that is connected by means of a transmission chain 13 to a first power input 14, in particular linked to the driving means of the support structure, so as to be driven in rotation according to the power source provided at said first input.

Moreover, the rotational driving mechanisms of each drum 5 comprise a speed reducer 15 that is connected to the first power input 14 through the horizontal shaft 12, the driving device of said mechanism comprising a vertical rotating shaft 11 that is connected at the output of said reducer to be driven in rotation by the power provided by said reducer. Finally, each driven body 10 comprises a toothed crown 16 that is engaged with a gear 17 mounted on the driven shaft 11, so as to be steered in rotation about the vertical axis A by the rotation of said driven shaft.

The shaker devices 3 also comprise each an oscillatory driving mechanism of their respective drum 5 about the respective vertical axis A thereof. Each oscillatory driving mechanism comprises at least one eccentric module 18 and a driving device 19 engaged with said module to steer its rotation, said module being connected to the shaft 6 by a mechanical member 20 arranged to transform the eccentric rotation of said module into an oscillation of the shaft 6 of the drum 5.

In particular, the oscillatory and rotational movements of the drum 5 are superimposed to one another, which enables to improve the shaking effort on the plants.

To that effect, the eccentric module(s) 18 is (are) mounted for rotation on the driven body 10, the mechanical member 20 being arranged to transmit the rotation of said driven body to the shaft 6.

Thus, the rotational and oscillatory driving mechanisms are implemented in a particularly simple and compact manner, while presenting an improved resistance to the mechanical constraints transmitted by the shaker rods 9.

In the embodiment shown, each oscillatory driving mechanism comprises three eccentric modules 18 that are angularly distributed on the driven body 10, which enables a better repartition of the oscillatory efforts around the shaft 6 of the drum 5.

Figure 2A:
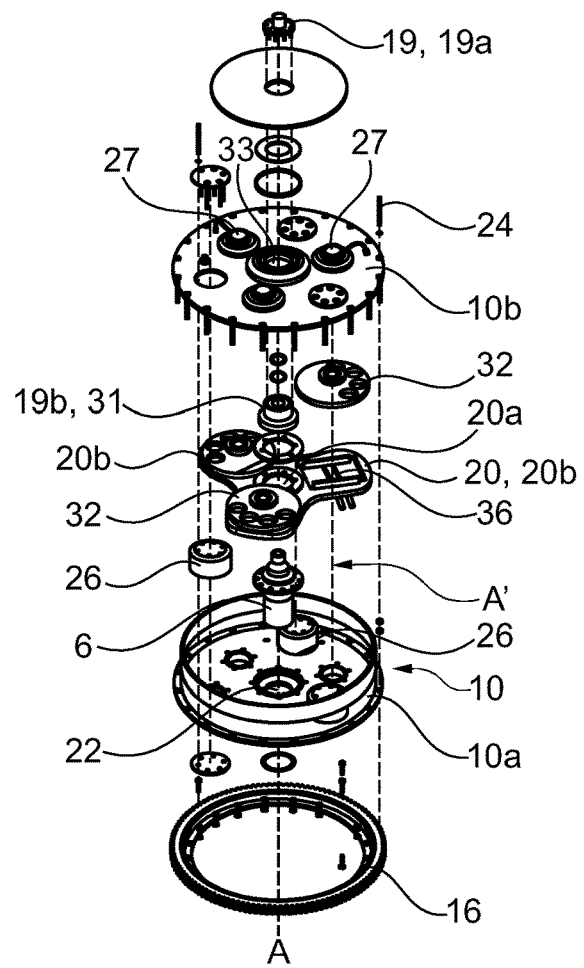
FIGS. 2a, 2b and 2c represent the rotation and oscillatory driving mechanisms of a shaker device of the harvesting unit of FIG. 1, respectively in a partially exploded view (FIG. 2a), in an assembled axial cross-section view (FIG. 2b) and in a radial cross-section top view (FIG. 2c)
Figure 2B:
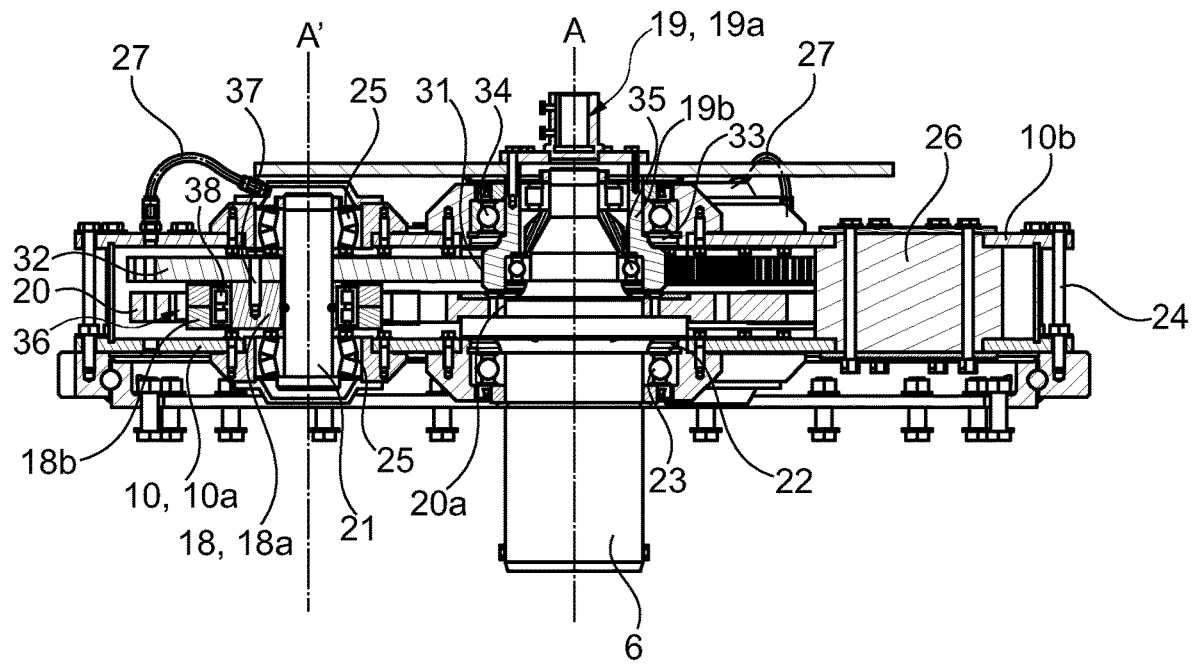
Figure 2C:
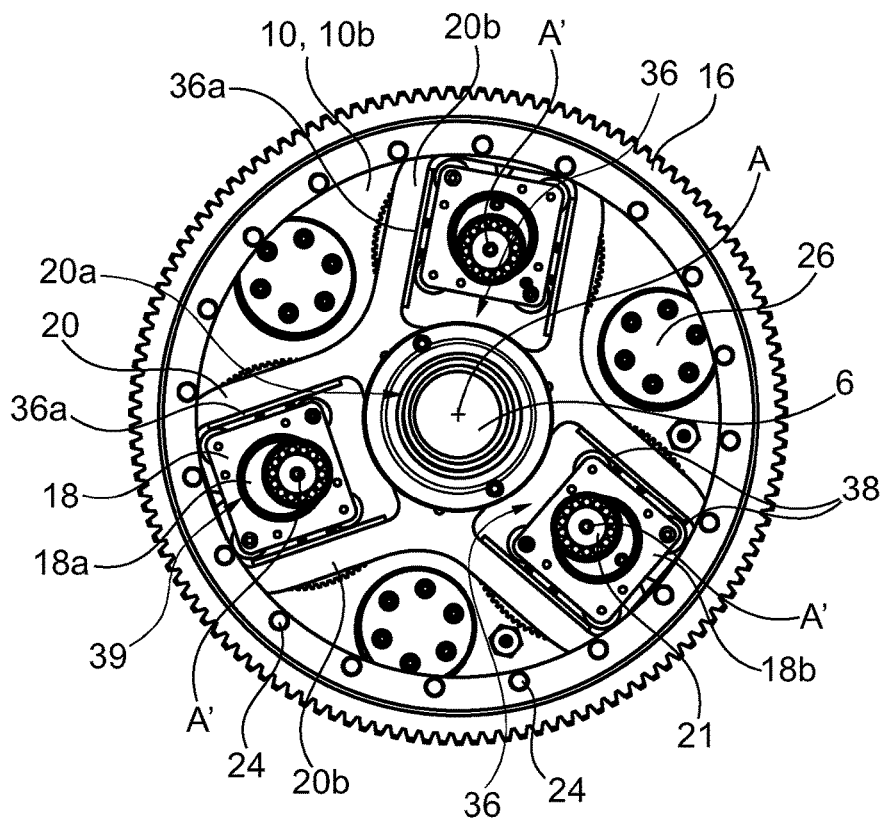

In relation to FIGS. 2b and 2c, the oscillatory driving mechanism comprises three planet shafts 21 that are each mounted for rotation on the driven body 10 about respectively a planet vertical axis A', each eccentric module 18 being mounted on respectively one planet shaft 21.

Each driven body 10 comprises a lower plate 10a on which the toothed crown 16 is associated in rotation, said lower plate comprising a central bore 22 wherein the shaft 6 is mounted for free rotation about the vertical axis A, in particular by means of a ball bearing 23.

Each driven body 10 also comprises an upper plate 10b that is mounted onto the lower plate 10a, in particular by means of several bolts 24 that also ensures the mounting of the toothed crown 16, each planet shaft 21 comprising upper and lower ends that are mounted for rotation on respectively the upper 10b and lower 10a plates, in particular by means of roller bearings 25.

Each driven body 10 comprises three reinforcement blocks 26 that are mounted between the upper 10b and lower 10a plates while being angularly distributed around the vertical axis A, so as to ensure an improved distribution of said reinforcement within the driven body 10. Moreover, the driven bodies 10 comprise each three lubrication means 27 that are mounted on the upper plate 10b adjacent respectively one planet shaft 21.

As shown in FIG. 1, the harvesting unit comprises a second central horizontal rotating shaft 28 that is connected through transmission means, for example gearing means, a transmission chain and/or a transmission belt, to a second power input 29, so as to be driven in rotation according to the power source provided at said second input.

Moreover, the oscillatory driving mechanisms of each drum 5 comprise a speed reducer 30 that is connected to the second input 29 through the second horizontal shaft 28, the driving device 19 of said mechanism comprising an upper piece 19a that is mounted for rotation about the vertical axis A at the output of said reducer, so as to be driven in rotation by the power provided by said reducer.

Finally, the driving device 19 comprises a lower piece 19b associated in rotation with the upper piece 19a, said lower piece comprising a toothed sun gear 31 that is geared with planet gears 32 that are each associated in rotation to respectively a planet shaft 21, so as to steer the rotation of each eccentric module 18.

In particular, the upper plate 10b comprises a central bore 33 wherein the lower piece 19b with the sun gear 31 is mounted for rotation, for example by means of a ball bearing 34. In the same way, the sun gear 31 is mounted for rotation around the shaft 6 of the drum 5 by means of a ball bearing 35.

The mechanical member 20 comprises windows 36 wherein respectively one eccentric module is mounted, said mounting being operable to transform the rotation of said eccentric module into an oscillation of the shaft 6.

In the embodiment shown, the mechanical member 20 comprises a central bore 20a wherein the shaft 6 is fixedly mounted, and three lobes 20b that are angularly distributed around the shaft 6 and that comprise each such a window 36.

According to an embodiment not shown, the oscillatory driving mechanism can comprise two eccentric modules of different eccentricity, but having the same external dimensions which are axially spaced from each other along a planet shaft 21, said planet shaft being mounted in translation along the corresponding planet vertical axis A' for allowing selective mounting of one of said modules inside the window 36.

Thus, according to the desired amplitude of oscillation, which depends in particular on the type of plant to be shaken, the operator of the harvesting machine can selectively shift the corresponding eccentric module into the window 36, for example through command means provided for that purpose into the driver station. Alternatively, the two eccentric modules can be mounted at a fixed vertical position on the planet shaft 21 and the mechanical member 20 can be shifted vertically to make the window or windows 36 engage the one or other eccentric module.

Figure 3:
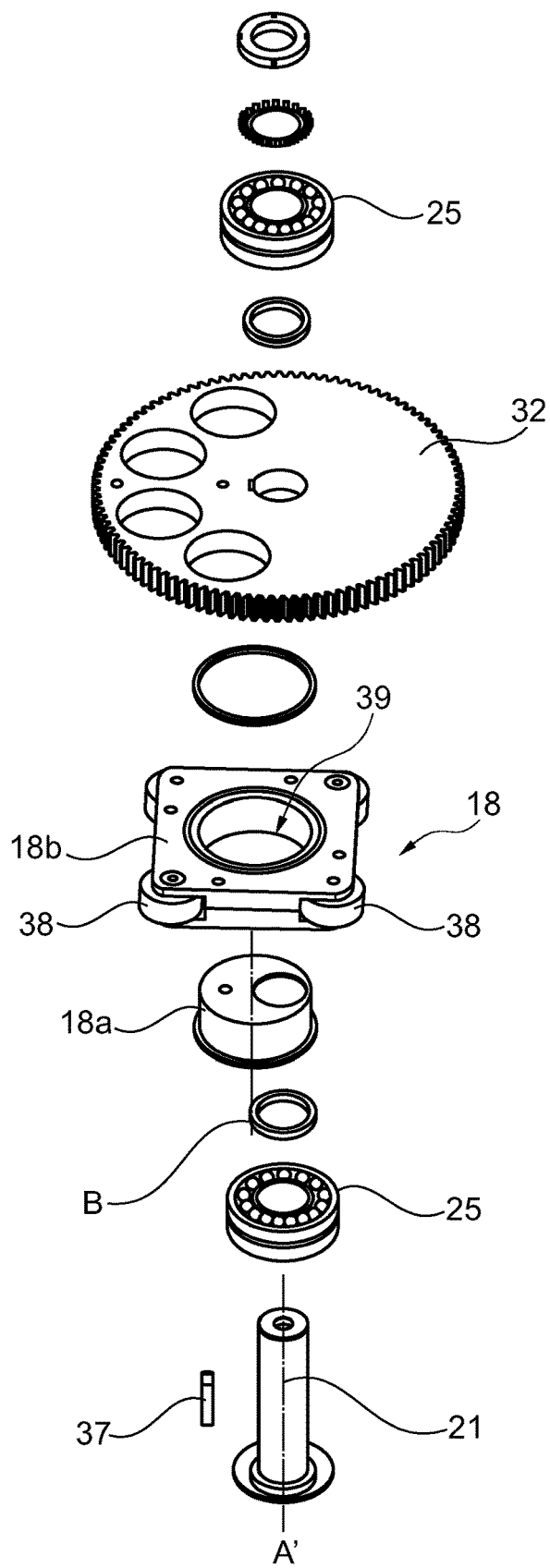
FIG. 3 represents partially in exploded view the oscillatory driving mechanism of FIGS. 2a, 2b and 2c.

As shown in FIGS. 2b and 3, the eccentric modules 18 comprise each a cylindrical base 18a that is mounted on the corresponding planet shaft 21 so that the revolution axis B of said base is offset from the planet vertical axis A', said base being rotatably coupled to an envelope 18b that is arranged inside the window 36.

In particular, the cylindrical base 18a is axially stacked under the planet gear 32, so as to improve the compactness of the assembly. Moreover, the cylindrical base 18a is fixed to the planet gear 32, in particular by means of a bolt 37.

The envelope 18b is mounted for radial translation inside the window 36, while being immobilised in the circumferential direction, so as to exert circumferential pushing forces alternatively against the opposite radial sides 36a of said window upon rotation of the planet shaft 21, and then to generate alternative oscillations of the mechanical member 20 about the vertical axis A.

The envelope 18b is provided with at least two rollers 38 that are mounted for rotation on respectively one lateral side of said envelope, said rollers being arranged to roll along respectively one radial side 36a of the window 36 upon radial translation of the envelope 18b inside said window, so as to facilitate said radial translation.

In the embodiment shown, the envelope 18b has a substantially square shape with rounded corners and comprises four rollers 38 that are each mounted for rotation on one of said corners. Moreover, the envelope 18b comprises a central bore 39 wherein the cylindrical base is fitted.

Although the present invention has been described with reference to a particular embodiment of the harvesting unit, other embodiments can be conceived without departing from the scope of the invention as defined by the accompanying claims. For instance, the eccentric module may comprise a crank connected to the planet gear 6 and having an eccentric shaft portion provided with a roller that is guided in a radially extending slot in the mechanical member, the slot taking the function of the window in the above embodiment. Such mounting would not require an envelope. It is also conceivable to use two eccentric modules, arranged on opposite sides of the drum shaft 6, or to use four or more eccentric modules, evenly distributed around this shaft. The driving mechanisms may also be provided at the lower end of the drum shaft 6, for easier access during repair and servicing operations.

The invention claimed is:

1. A harvesting unit comprising:
   a chassis intended to be moved along rows of plants to be harvested, and
   a shaker system including at least one shaker device comprising:
      a drum operable to detach a crop from the plants, the drum comprising a drum shaft mounted for rotation on the chassis about a vertical axis and shaker organs mounted to the drum shaft;
      a rotational driving mechanism for the drum, the rotational driving mechanism comprising a driven body and a first driving device engaged with the driven body to steer rotation of the driven body about the vertical axis; and
      an oscillatory driving mechanism of the drum about the vertical axis, the oscillatory driving mechanism comprising at least one eccentric module and a second driving device engaged with the at least one module to steer its rotation of the at least one eccentric module, the at least one eccentric module being drivingly connected to the drum shaft by a mechanical member operable to transform the rotation of the at least one eccentric module into an oscillation of the drum shaft,
   wherein the at least one eccentric module is mounted for rotational and translational motion on the driven body of the rotational driving mechanism,
   wherein the mechanical member is arranged to transmit the rotation of the driven body to the drum shaft, and
   wherein the mechanical member comprises a window wherein the at least one eccentric module is mounted, the mounting of the at least one eccentric module in the window being operable to transform the rotation of the at least one eccentric module into an oscillation of the mechanical member.

2. The harvesting unit according to claim 1, wherein the oscillatory driving mechanism comprises a planet shaft that is mounted for rotation on the driven body about a planet vertical axis, the at least one eccentric module being mounted to the planet shaft.

3. The harvesting unit according to claim 2, wherein the second driving device of the oscillatory driving mechanism comprises a sun gear that is mounted for rotation about the vertical axis, the sun gear meshing with a planet gear associated in rotation to the planet shaft to steer the rotation of the at least one eccentric module.

4. The harvesting unit according to claim 3, wherein the at least one eccentric module comprises a cylindrical base that is affixed to the planet shaft so that an axis of the cylindrical base is offset from the planet vertical axis, the cylindrical base being rotatably coupled to an envelope that is arranged inside the window, and wherein the cylindrical base is axially stacked and fixed under the planet gear.

5. The harvesting unit according to claim 2, wherein the driven body comprises an upper plate onto which the planet shaft is mounted for rotation.

6. The harvesting unit according to claim 1, wherein the at least one eccentric module is mounted for radial translation relative to the mechanical member inside the window.

7. The harvesting unit according to claim 1, wherein the at least one eccentric module is immobilized in a circumferential direction relative to the mechanical member inside the window.

8. The harvesting unit according to claim 2, wherein the at least one eccentric module comprises a cylindrical base that is affixed to the planet shaft so that an axis of the cylindrical base is offset from the planet vertical axis, the cylindrical base being rotatably coupled to an envelope that is arranged inside the window.

9. The harvesting unit according to claim 8, wherein the envelope comprises at least two rollers that are mounted for rotation on opposite sides of the envelope, the rollers being arranged to roll along respective opposite sides of the window upon radial translation of the envelope inside the window.

10. The harvesting unit according to claim 2, wherein the oscillatory driving mechanism comprises two eccentric modules of different eccentricity which are axially spaced from each other along the planet shaft, the planet shaft being mounted for translation along the planet vertical axis for allowing selective mounting of one of the modules inside the window.

11. The harvesting unit according to claim 1, wherein the oscillatory driving mechanism comprises three eccentric modules that are angularly distributed on the driven body.

12. The harvesting unit according to claim 11, wherein the window is one of three windows of the mechanical member and wherein the mechanical member comprises three lobes that are angularly distributed around the drum shaft, each lobe comprising a respective window of the three windows wherein respectively one eccentric module is mounted.

13. The harvesting unit according to claim 1, wherein the chassis delimits a tunnel for successive introduction of plants to be harvested, and the shaker system includes two shaker devices that are arranged respectively on one side of the tunnel.

14. A harvesting machine comprising a motorised support structure that is movable along rows of plants, and a harvesting unit according to claim 1 mounted on the motorised support structure for detaching crop from the plants.

15. The harvesting machine according to claim 14, further comprising a controller for controlling the first driving device such that a rotation driving speed of the drum is set according to a travelling speed of the support structure.

16. A harvesting unit comprising:
   a chassis intended to be moved along rows of plants to be harvested, and
   a shaker system including at least one shaker device comprising:
      a drum operable to detach a crop from the plants, the drum comprising a drum shaft mounted for rotation on the chassis about a vertical axis and shaker organs mounted to the drum shaft;
      a rotational driving mechanism for the drum, the rotational driving mechanism comprising a driven body and a first driving device engaged with the driven body to steer rotation of the driven body about the vertical axis; and
      an oscillatory driving mechanism of the drum about the vertical axis, the oscillatory driving mechanism comprising:
         at least one eccentric module;

a second driving device engaged with the at least eccentric one module to steer rotation of the at least one eccentric module;

a mechanical member drivingly connecting the at least one eccentric module to the drum shaft and operable to transform the rotation of the at least one eccentric module into an oscillation of the drum shaft, the mechanical member comprising a window in which the at least one eccentric module is mounted, the mounting of the at least one eccentric module in the window being operable to transform the rotation of the at least one eccentric module into an oscillation of the mechanical member; and a planet shaft that is mounted for rotation on the driven body about a planet vertical axis, the at least one eccentric module being mounted to the planet shaft, wherein the at least one eccentric module is mounted for rotation on the driven body of the rotational driving mechanism, wherein the mechanical member is arranged to transmit the rotation of the driven body to the drum shaft, and wherein the at least one eccentric module is immobilized in a circumferential direction relative to the mechanical member inside the window.

17. A harvesting unit comprising:

a chassis intended to be moved along rows of plants to be harvested, and a shaker system including at least one shaker device comprising:

a drum operable to detach a crop from the plants, the drum comprising a drum shaft mounted for rotation on the chassis about a vertical axis and shaker organs mounted to the drum shaft;

a rotational driving mechanism for the drum, the rotational driving mechanism comprising a driven body and a first driving device engaged with the driven body to steer rotation of the driven body about the vertical axis; and an oscillatory driving mechanism of the drum about the vertical axis, the oscillatory driving mechanism comprising:

at least one eccentric module;

a planet shaft that is mounted for rotation on the driven body about a planet vertical axis, the at least one eccentric module being mounted to the planet shaft;

a second driving device engaged with the at least eccentric one module to steer rotation of the at least one eccentric module, the second driving device comprising a sun gear that is mounted for rotation about the vertical axis, the sun gear meshing with a planet gear associated in rotation to the planet shaft to steer the rotation of the at least one eccentric module; and a mechanical member drivingly connecting the at least one eccentric module to the drum shaft and operable to transform the rotation of the at least one eccentric module into an oscillation of the drum shaft, the mechanical member comprising a window in which the at least one eccentric module is mounted, the mounting of the at least one eccentric module in the window being operable to transform the rotation of the at least one eccentric module into an oscillation of the mechanical member, wherein the at least one eccentric module is mounted for rotation on the driven body of the rotational driving mechanism, and wherein the mechanical member is arranged to transmit the rotation of the driven body to the drum shaft.

* * * * *